(12) United States Patent
Braun (10) Patent No.: US 7,080,441 B2
(45) Date of Patent: Jul. 25, 2006

(54) COMPOSITE FUSELAGE MACHINE AND METHOD OF AUTOMATED COMPOSITE LAY UP

(75) Inventor: Rudolf Braun, Winnipeg (CA)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 10/630,594

(22) Filed: Jul. 28, 2003

(65) Prior Publication Data

US 2005/0023414 A1 Feb. 3, 2005

(51) Int. Cl.
*B21B 1/46* (2006.01)
*B23Q 7/00* (2006.01)
*E04G 1/18* (2006.01)
*B64C 1/00* (2006.01)

(52) U.S. Cl. ............... 29/527.2; 29/527.1; 29/559; 182/141

(58) Field of Classification Search ............... 29/559, 29/527.1, 527.2, 527.4, 460, 428, 426.1; 182/141, 128; 414/10; 266/280; 244/120
See application file for complete search history.

(56) References Cited

U.S. PATENT DOCUMENTS

| | | | |
|---|---|---|---|
| 3,298,154 A * | 1/1967 | Behr et al. ............. 52/749.15 |
| 3,517,771 A * | 6/1970 | Langlitz et al. ............. 182/141 |
| 3,692,601 A | 9/1972 | Hardesty et al. |
| 3,879,245 A | 4/1975 | Fetherson et al. |
| 4,064,534 A | 12/1977 | Chen et al. |
| 4,253,646 A * | 3/1981 | Goto et al. ............. 266/281 |
| 4,310,132 A | 1/1982 | Frosch |
| 4,548,859 A | 10/1985 | Kline et al. |
| 4,608,220 A | 8/1986 | Caldwell |
| 4,693,678 A | 9/1987 | Von Volkli |
| 4,699,683 A | 10/1987 | McCowin |
| 4,760,444 A | 7/1988 | Nielson et al. |
| 4,780,262 A | 10/1988 | Von Volkli |
| 4,790,898 A | 12/1988 | Woods |
| 4,830,298 A | 5/1989 | Van Blunk |
| 4,867,834 A | 9/1989 | Alenskis et al. |
| 4,877,471 A | 10/1989 | McCowin et al. |
| 4,941,182 A | 7/1990 | Patel |
| 5,024,399 A | 6/1991 | Barquet |
| 5,058,497 A | 10/1991 | Bishop et al. |
| 5,337,647 A | 8/1994 | Roberts et al. |

(Continued)

FOREIGN PATENT DOCUMENTS

DE 20 53 427 A 5/1971

(Continued)

OTHER PUBLICATIONS http://www.cinmach.com/WolfTracks4_1/MTG_WT7.htm; Premier I Features Lighter, Stronger All-Composite Fuselage, 3 pages.

(Continued)

*Primary Examiner*—John C. Hong
(74) *Attorney, Agent, or Firm*—Shimokaji & Associates, P.C.

(57) ABSTRACT

A device for automated composite lay up of a part to be manufactured—such as a large aircraft fuselage—includes a mandrel having a vertical axis and an interior mandrel surface that conforms to an outside mold line of the part. A vertical movement shaft is disposed inside the mandrel. A platform is supported, moved up and down, and rotated on the vertical movement shaft. One or more arm mechanisms are attached to the platform. One or more material delivery heads are supported by the arm mechanisms, and the arm mechanisms moves and positions the material delivery heads relative to the interior mandrel surface so that composite material is delivered directly to the outside mold line on the interior mandrel surface.

23 Claims, 4 Drawing Sheets

U.S. PATENT DOCUMENTS

| | | | |
|---|---|---|---|
| 5,439,549 A | 8/1995 | Fryc et al. |
| 5,450,147 A | 9/1995 | Dorsey-Palmateer |
| 5,540,126 A | 7/1996 | Piramoon |
| 5,651,600 A | 7/1997 | Dorsey-Palmateer |
| 5,683,646 A | 11/1997 | Reiling, Jr. |
| 5,700,337 A | 12/1997 | Jacobs et al. |
| 5,746,553 A | 5/1998 | Engwall |
| 5,804,276 A | 9/1998 | Jacobs et al. |
| 5,814,386 A | 9/1998 | Vasiliev et al. |
| 5,871,117 A | 2/1999 | Protasov et al. |
| 5,963,660 A | 10/1999 | Koontz et al. |
| 5,979,531 A | 11/1999 | Barr et al. |
| 6,012,883 A | 1/2000 | Engwall et al. |
| 6,013,341 A | 1/2000 | Medvedev et al. |
| 6,045,651 A | 4/2000 | Kline et al. |
| 6,074,716 A | 6/2000 | Tsotsis |
| 6,086,696 A | 7/2000 | Gallagher |
| 6,112,792 A | 9/2000 | Barr et al. |
| 6,168,358 B1 | 1/2001 | Engwall et al. |
| 6,205,239 B1 | 3/2001 | Lin et al. |
| 6,364,250 B1 | 4/2002 | Brinck |
| 6,390,169 B1 | 5/2002 | Johnson |
| 6,451,152 B1 | 9/2002 | Holmes et al. |
| 6,480,271 B1 | 11/2002 | Cloud et al. |
| 6,648,273 B1 | 11/2003 | Anast |
| 6,692,681 B1 | 2/2004 | Lunde |
| 6,799,619 B1 | 10/2004 | Holmes et al. |
| 2002/0141632 A1 | 10/2002 | Engelbart et al. |

FOREIGN PATENT DOCUMENTS

| | | | |
|---|---|---|---|
| EP | 046 015 A | 2/1982 |
| EP | 0 198 744 A | 10/1986 |

OTHER PUBLICATIONS http://www.cinmach.com/compnews/PressReleeases/ pr00-11.htm; Raytheon Aircraft Orders Four More Fiber Cincinnati Fiber Placement Systems for Industry's First Composite-Fuselage Business Jets, 2 pages.

http://www.rockymountaincomposites.com/wind_sys.htm; Filament Winding, 2 pages.

Fiedler, L., et al., "*Tango Composite Fuselage Platform*", SAMPE Journal, vol. 39, No. 1, Jan./Feb. 2003, 1 page.

BAe 146, Flight International, May 2, 1981, 2 pages.

A Barrelful of Experience, Intervia, May 1992, 2 pages.

Raytheon, Mar. 2000, vol. 4, No. 2, http://www.cts.com/king/vasci/newsletter/vol42.html, 2 pages.

Business Aviation, Jun. 7, 2002, http://www.aviation.com/avnow/news/channel/busav.jsp?view=story&id=news/btoyo0607.xml, 1 page.

Beechcraft's Composite Challenge, http://www.aerotalk.com/beech.cfm, 2 pages.

Evans, Don O., "*Fiber Placement*", 3 pages, Cincinnati Machine, pp. 477-479.

Azco Corp., http://www.azcocorp.com/products/sur-cut-quillotine-knife-assemblies.php, "SUR-CUT™ Guillotine Knife Assemblies", 2004, Azco Corp., Fairfield, NJ, USA, 2 pages.

"Mobility Solutions" ("Wheel Units"), http://www.maxmove.se/, (Aug. 2004) © MaxMove AB, Bjurholm, Sweden, 1 page.

\* cited by examiner

COMPOSITE FUSELAGE MACHINE AND METHOD OF AUTOMATED COMPOSITE LAY UP

BACKGROUND OF THE INVENTION

The present invention generally relates to fabrication of large composite structures and, more particularly, to automated composite lay up of large aircraft fuselage sections.

The structural performance advantages of composites, such as carbon fiber epoxy and graphite bismaleimide (BMI) materials, are widely known in the aerospace industry. Aircraft designers have been attracted to composites because of their superior stiffness, strength, and radar absorbing capabilities, for example. As more advanced materials and a wider variety of material forms have become available, aerospace usage of composites has increased. Automated tape layer technology has developed to become a widely used automated process for fabrication of large composite structures such as wing panels and empennage. Current tape layer technology has been improved to offer flexibility in process capabilities required for a wide variety of aerospace components. As aerospace industry tape laying applications achieve material lay up rates, for example, that may help control the manufacturing cost of large composite structures, new and innovative applications for tape layers may be defined, such as the automated tape lay up of large aircraft fuselage sections, for example, 15 to 20 feet in diameter.

Automated tape laying machines typically are gantry style machines that may have, for example, ten axes of movement with 5-axis movement on the gantry and 5-axis movement on the delivery head. A typical automated tape layer consists of a gantry structure (parallel rails), a cross-feed bar that moves on precision ground ways, a ram bar that raises and lowers the material delivery head, and the material delivery head which is attached to the lower end of the ram bar. Commercial tape layers are generally configured specifically for lay up of flat or mildly contoured laminate applications using either flat tape laying machines (FTLM) or contour tape laying machines (CTLM). On a gantry style tape layer, tooling (or a flat table) is commonly rolled under the gantry structure, secured to the floor, and the machine delivery head is then initialized to the lay-up surface.

Figure 1:
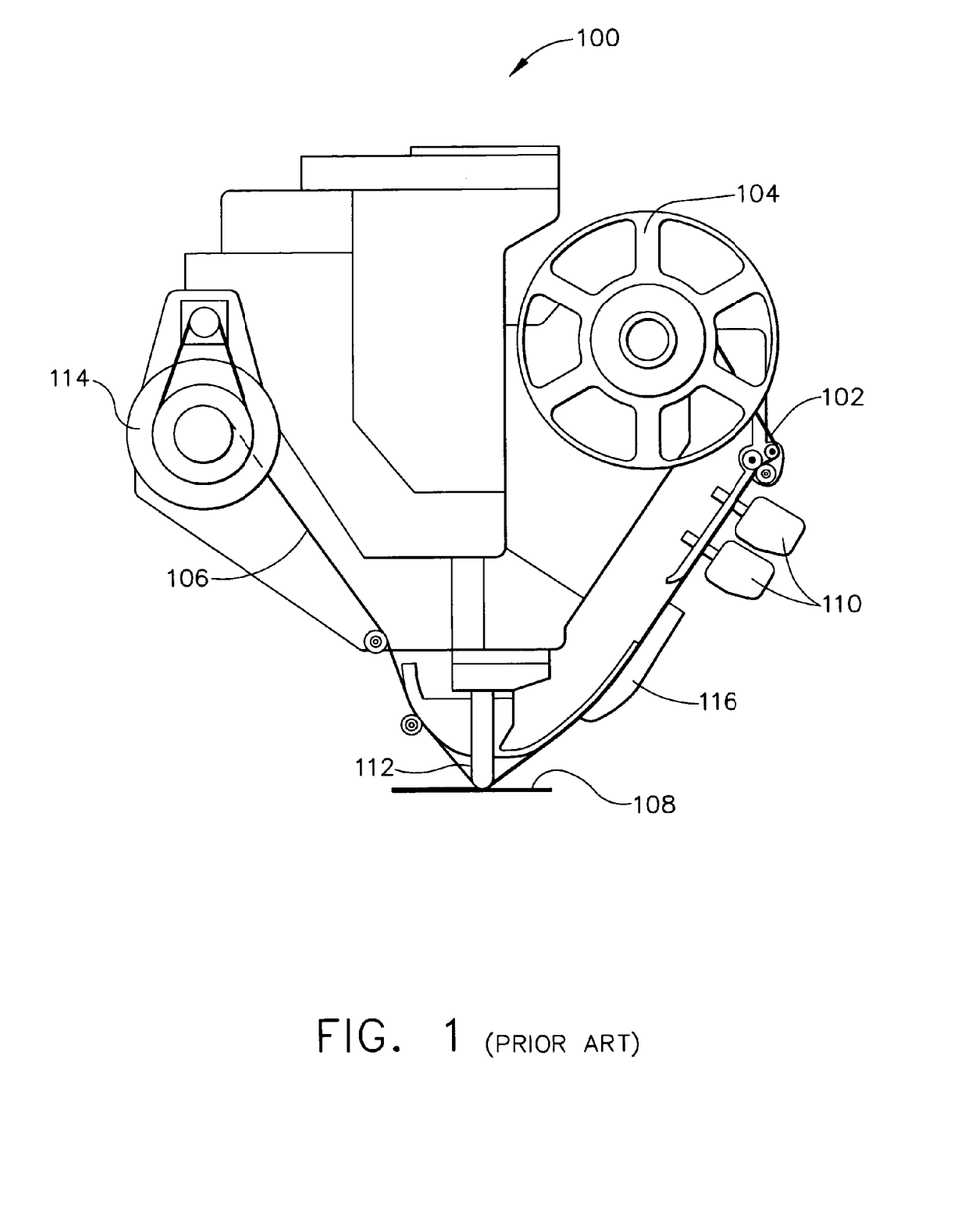
FIG. 1 is a diagram of a typical tape laying machine material delivery head, as known in the art.

FIG. 1 provides an illustration of a typical tape laying machine material delivery head 100. Delivery heads for FTLM and CTLM machines are basically the same configuration as that of delivery head 100 shown in FIG. 1. The delivery heads on commercial automated tape layers are typically configured to accept material widths of 75 mm (3"), 150 mm (6"), and 300 mm (12"). Flat tape layers typically use material in 150 mm (6") and 300 mm (12") widths. Contour tape layers typically use material in 75 mm (3") and 150 mm (6") widths. CTLM systems normally use the 3" or 6" wide material when laying up flat plane contour surfaces. Material 102 for tape layers generally comes in large diameter spools. The tape material 102 has a backing paper 106, which must be extracted as the prepreg (resin pre-impregnated fiber) is applied to the tool surface 108. The spool of material typically is loaded into the delivery head supply reel 104 and threaded through the upper tape guide chute and past the cutters 110. The material 102 then passes through the lower tape guides, under the segmented compaction shoe 112, and onto a backing paper take up reel 114. The backing paper is extracted and wound on a take up roller of paper take up reel 114. The delivery head 100 makes contact with the tool surface 108 and the tape material 102 is "placed" onto the tool surface 108 with compaction pressure. The tape laying machine typically lays tape on the tool surface 108 in a computer programmed path (course), cuts the material 102 at a precise location and angle, lays out tail, lifts delivery head 100 off the tool surface 108, retracts to the course start position, and begins laying the next course. The delivery head 100 may have an optical tape flaw detection system that signals the machine control to stop laying tape material 102 when a flaw has been detected. The delivery head 100 also typically has a heating system 116 that heats the prepreg materials to increase tack levels for tape-to-tape adhesion. Heated tape temperatures generally range from 80 F to 110° F.

Fiber placement is a similar process in which individual prepreg fibers, called tows, are pulled off spools and fed through a fiber delivery system into a fiber placement head, which is similar to delivery head 100 shown in FIG. 1. In the fiber placement head, tows may be collimated into a single fiber band and laminated onto a work surface, which can be mounted between a headstock and tailstock. When starting a fiber band or course, the individual tows are fed through the head and compacted onto a surface —such as surface 108. As the course is being laid down, the head 100 can cut or restart any of the individual tows. This permits the width of the fiber band to be increased or decreased in increments equal to one tow width. Adjusting the width of the fiber band eliminates excessive gaps or overlaps between adjacent courses. At the end of the course, the remaining tows may be cut to match the shape of the ply boundary. The head may then be positioned to the beginning of the next course. During the placement of a course, each tow is dispensed at its own speed, allowing each tow to independently conform to the surface 108 of the part. Because of this, the fibers are not restricted to geodesic paths. They can be steered to meet specified design goals. A rolling compaction device, combined with heat for tack enhancement, laminates the tows onto the lay-up surface 108. This action of pressing tows onto the work surface (or a previously laid ply) adheres the tows to the lay-up surface 108 and removes trapped air, minimizing the need for vacuum debulking. It also allows the fiber to be laid onto concave surfaces.

A fiber placement head, like the tape laying head, may be provided with several axes of motion, using an arm mechanism, for example, and may be computer numeric controlled. The axes of motion may be necessary to make sure the head 100 is normal to the surface 108 as the machine is laminating tows. The machine may also have a number of electronic fiber tensioners, which may be mounted, for example, in an air conditioned creel. These tensioners may provide individual tow payout and maintain a precise tension. The head 100 may precisely dispense, cut, clamp, and restart individual prepreg tows.

In the quest to automate the placement of composite materials at a high rate—to make the use of composites economical compared to conventional methods of fuselage fabrication—efforts have been focused at wrapping around a male mandrel, also referred to as "tool". Today's composite, fiber material placement processes and equipment have used male mandrels exclusively, wrapping tape layers on the outside surface of the tool—such as tool surface 108. One problem with this approach is that controlling the outside surface—also referred to as the outside mold surface or "outside mold line" (OML)— of the part—such as a fuselage section—is not possible without transferring the part to a female tool or clam-shell type tooling.

Other problems with the approach of wrapping composite materials around a male mandrel, or tool, are related to the handling of large rotating tools. Both filament winding and fiber placement typically utilize mounting the tool on a horizontal spindle. The fact that the tool inertia is reacted though a relatively small spindle shaft imposes dynamic instability problems in the tool design. The typical horizontal layout also causes sag in large tools. The longer and larger in diameter the tool is, the more severe the dynamic stability and sag issues become.

As can be seen, there is a need for fabrication of composite parts using an automated lay up machine that allows material placement directly to an outside mold surface, from inside a tool, allowing greater control and accuracy forming the exterior surface of the part. There is also a need for fabrication of composite parts using an automated lay up machine that eliminates expansion and transfer of the part to another tool, resulting in less defects and higher surface quality for the part. Moreover, there is a need for an automated lay up machine for composite fabrication of large diameter fuselage sections that avoids the problems associated with horizontal tools.

SUMMARY OF THE INVENTION

In one aspect of the present invention, a device for automated composite lay up using a material delivery head includes a mandrel having a vertical axis and an outside mold surface on the inside of the mandrel. A vertical movement shaft is disposed inside the mandrel. An arm mechanism, supported by the vertical movement shaft, moves and positions the material delivery head inside the mandrel, so that composite material is delivered directly to the outside mold surface.

In another aspect of the present invention, a device for automated composite lay up of a part to be manufactured includes a mandrel having a vertical axis. The mandrel has an interior mandrel surface that conforms to an outside mold line of the part. A vertical movement shaft is disposed inside the mandrel. An arm mechanism is supported by the vertical movement shaft. A material delivery head is supported by the arm mechanism, and the arm mechanism moves and positions the material delivery head relative to the interior mandrel surface so that composite material is delivered directly to the outside mold line on the interior mandrel surface.

In still another aspect of the present invention, a device for automated composite lay up of a part to be manufactured includes a mandrel having a vertical axis and an interior mandrel surface that conforms to an outside mold line of the part. A vertical movement shaft is disposed inside the mandrel. A platform is supported and moved up and down on the vertical movement shaft. An arm mechanism is attached to the platform. A material delivery head is supported by the arm mechanism, and the arm mechanism moves and positions the material delivery head relative to the interior mandrel surface so that composite material is delivered directly to the outside mold line on the interior mandrel surface.

In yet another aspect of the present invention, an aircraft part manufacturing device for automated composite lay up includes a mandrel having a vertical axis and an interior mandrel surface that conforms to an outside mold line of the aircraft part. A vertical movement shaft is disposed inside the mandrel. A platform is supported by the vertical movement shaft, the platform is moved up and down by the vertical movement shaft, and the platform rotates about the vertical axis. An arm mechanism is attached to the platform. A material delivery head is supported by the arm mechanism. The arm mechanism provides motion of the material delivery head relative to the interior mandrel surface in a direction normal to the interior mandrel surface. The arm mechanism provides rotation of the material delivery head relative to the interior mandrel surface about an axis normal to the interior mandrel surface. The arm mechanism provides circumferential positioning of the material delivery head relative to the interior mandrel surface, and composite material is delivered directly to the outside mold line on the interior mandrel surface.

In a further aspect of the present invention, an aircraft part manufacturing device for automated composite lay up includes a mandrel having an axis of symmetry and an outside mold surface on the inside of the mandrel; means for situating the mandrel so that the axis of symmetry is vertical; means for supporting a material delivery head inside the mandrel; and means for moving and positioning the material delivery head inside the mandrel so that composite material is delivered directly to the outside mold surface.

In a still further aspect of the present invention, a method for automated composite lay up of a part, includes steps of: situating a mandrel, having an axis and an outside mold surface on the inside of the mandrel, so that the axis is vertical; placing the mandrel so that a vertical movement shaft is disposed inside the mandrel; supporting an arm mechanism by the vertical movement shaft so that the arm mechanism moves and positions a material delivery head inside the mandrel; and delivering composite material directly to the outside mold surface.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides fabrication of parts made of composite materials, which may be used, for example, in the manufacture of commercial and military aircraft. In one embodiment, an automated lay up machine allows material placement directly to an outside mold surface and eliminates prior art techniques of expansion and transfer of the part to another tool, allowing greater control and accuracy over the prior art in forming the exterior surface of the part and resulting in less defects and higher surface quality compared to parts fabricated according to the prior art. In one embodiment, an automated lay up machine may be ideally suited for composite fabrication of fuselage sections having large diameter, for example, from 15 to 20 feet. The automated lay up machine may place the composite materials directly to the outside mold surface from inside the tool, i.e., mandrel. Such operation would be difficult for prior art fuselage fabrications—such as Premier I and Horizon business jets made by Raytheon, Inc.—because of the relatively small diameter of the business jet fuselage, which may necessitate conventional outside lay up using a male mandrel. Automated tape and fiber lay up equipment and gantry could easily fit, however, within a large commercial aircraft fuselage, for which the diameter could reach in excess of 20 feet.

Moreover, the multiple delivery heads of one embodiment allow for fast material build up from outside mold line (OML) to inside mold line (IML) at rates that are economical for the production of large fuselage sections. Multiple delivery heads also may provide a number of significant advantages. Multiple delivery heads may be aligned and positioned so that opposite delivery heads react the opposing compaction loads as the prepreg composite material is being deposited. For example, there may be less deflection of the material delivery heads enabling greater accuracy in positioning the material delivery heads, while at the same time the structures and mechanisms for moving and supporting the delivery heads may be made lighter as compared to prior art supporting structures, which are typically cantilever supported, requiring great strength to support the relatively heavy weight material delivery heads.

In addition, an embodiment of the present invention allows for a vertical orientation of the mold or lay up mandrel that may confer additional advantages, for example, providing mechanical stability for precisely controlling the automated material lay up equipment, eliminating the "sag" of a horizontal mandrel, and using the assistance of gravity for "draping" cloth material on the mold, which cannot be readily achieved using a horizontal orientation of the mold or lay up mandrel. Furthermore, because the material delivery heads may be mounted on a rotating platform inside the mandrel, or tool, the mandrel tool itself need not be rotated. Thus, the problems associated with large rotating tools described above may also be avoided. Also, the vertical configuration of one embodiment may allow more complex mandrel shapes than the straight cylindrical shapes (cylinder of constant cross section) to which a horizontal configuration common in the prior art is typically limited and may be more practical for mounting the fiber placement heads and creels needed for lay down to the more complex shapes. Moreover, the vertical configuration may require less floor space than the typical prior art horizontal configuration would require for manufacture of the same part.

Because use of the tool of one embodiment eliminates prior art techniques of building on a male mandrel and transferring to a female mandrel tool, the problems inherent in such prior art techniques may be avoided. For example, using prior art tools and processes, graphite or other fibers wrapped in the hoop direction around a fuselage do not allow the composite to expand out and conform properly to the female tool, creating difficulty for expanding the part, so that the part does not make proper contact with, or conform to the female tool. Parts made using an embodiment of the present invention may be expected to be of higher quality and have fewer exterior surface defects because the prior art need to expand the part has been eliminated, eliminating those problems associated with the prior art fabrication tools and techniques.

Figure 2:
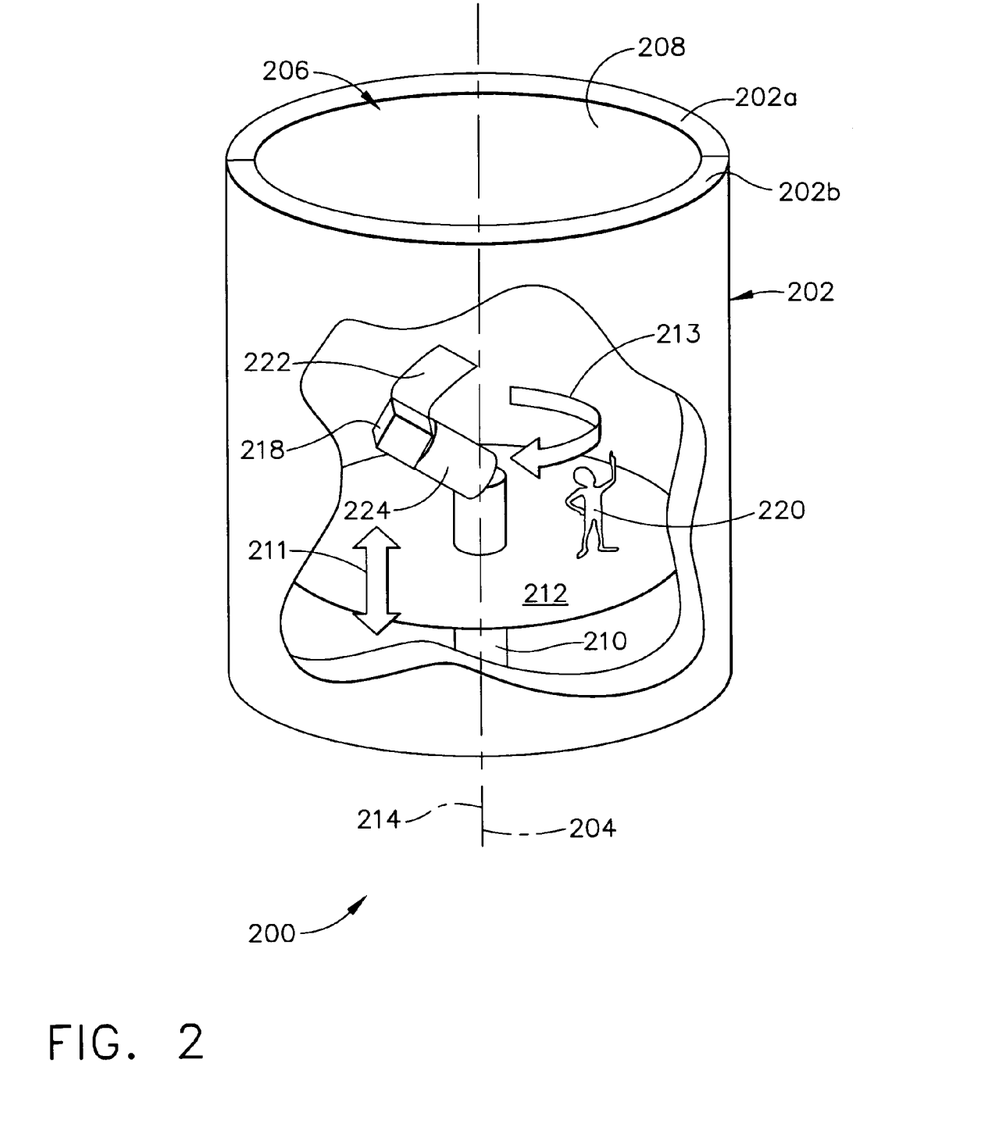
FIG. 2 is a perspective illustration with a partial cut away view of an aircraft part manufacturing device for automated composite lay up, according to one embodiment of the present invention.
Figure 3:
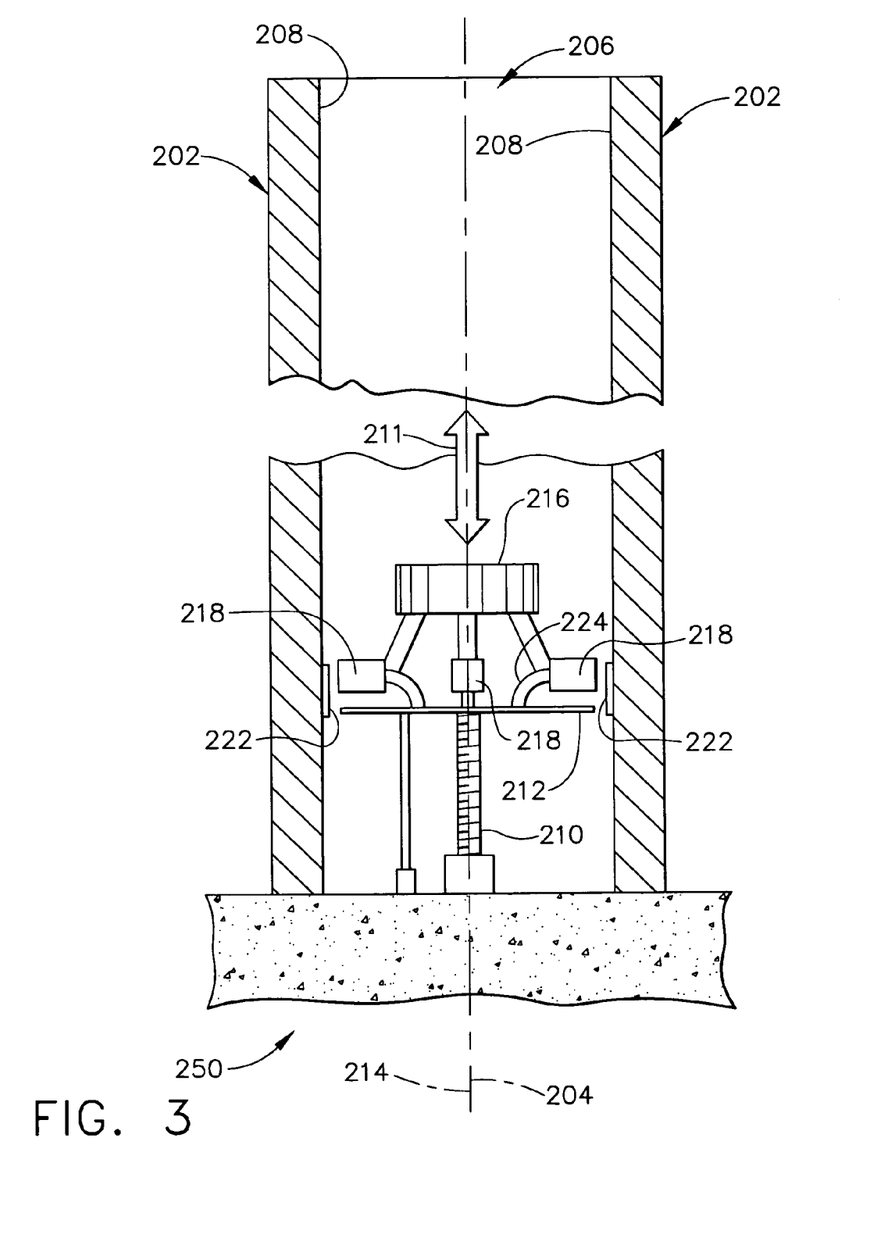
FIG. 3 is a cross section view of an aircraft part manufacturing device for automated composite lay up, according to another embodiment of the present invention.
Figure 4:
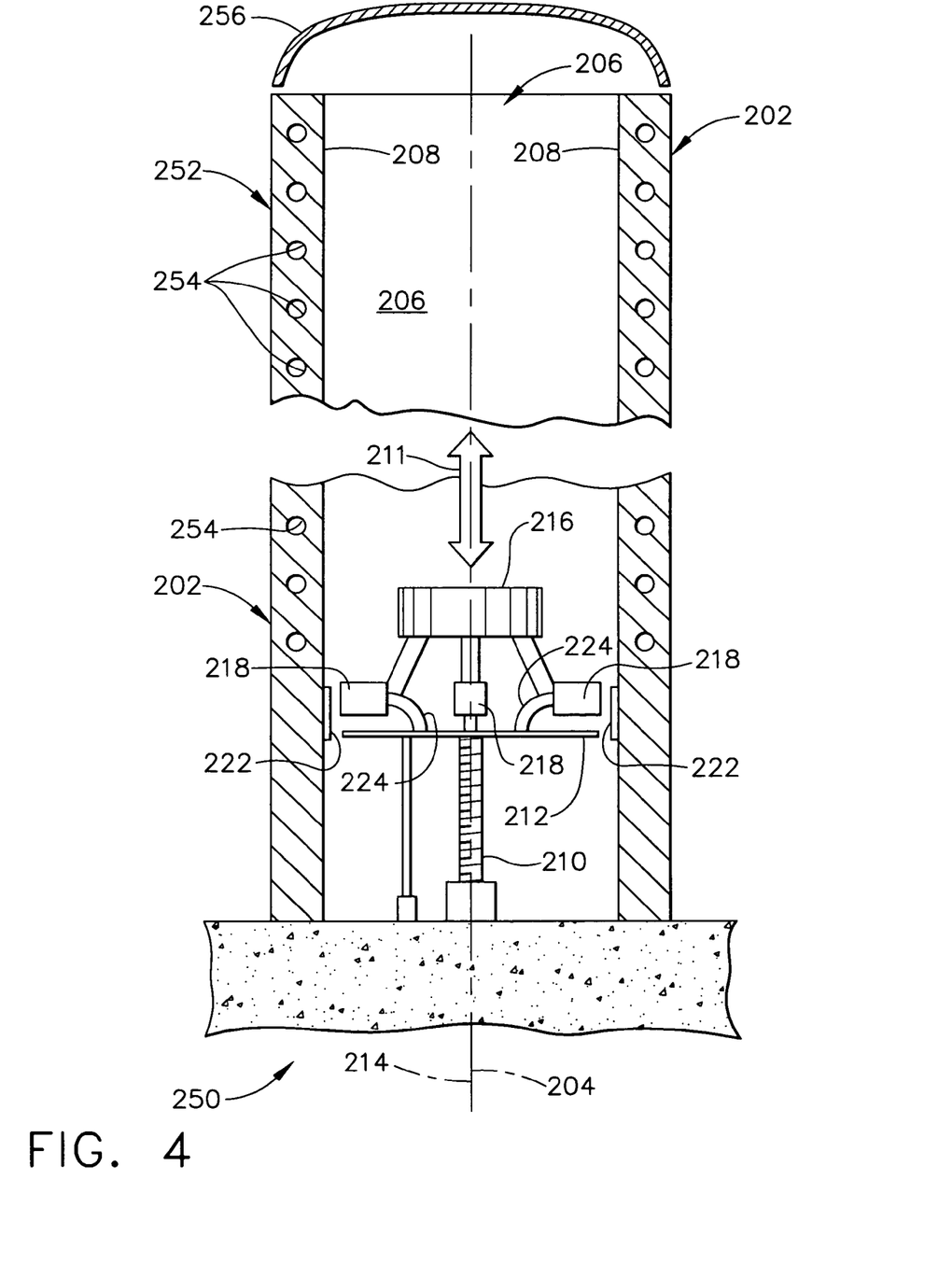
FIG. 4 is a cross section view of an aircraft part manufacturing device for automated composite lay up, having additional features to the embodiment shown in FIG. 3.

Referring now to the figures, wherein like items are referenced with the same numerals, and in particular, referring to FIG. 2, an aircraft part manufacturing device 200 for automated composite lay up is illustrated in accordance with one embodiment. FIGS. 3 and 4 illustrates device 250 according to another embodiment. Devices 200 and 250 may include a mandrel 202 that may be symmetrical around an axis 204, which may oriented vertically, as shown in the figures. Mandrel 202 may be approximately cylindrical, or circularly symmetrical about axis 204, i.e., axis 204 may be an axis of symmetry or an axis of rotation of mandrel 202. Mandrel 202 need not, however, have a straight cylindrical contour and constant cross section, as shown in the figures. Mandrel 202 may have a more complex shape, with varying cross sections, than that shown. Although axis 204 is shown as an axis of symmetry for convenient purposes of illustration for the examples shown, which are symmetrical. Mandrel 202 also may be non-symmetrical about axis 204. Thus, axis 204 need not be an axis of symmetry of mandrel 202, but does provide a means for referencing the orientation of mandrel 202. For example, a non-symmetrical mandrel 202 may be situated so that its axis 204 is vertical.

The inside 206 of mandrel 202 may have an interior mandrel surface 208, which may conform to an outside mold surface or an outside mold line (OML) of an aircraft part to be manufactured. Interior mandrel surface 208 may also be referred to as the "outside mold surface" or "OML". Mandrel 202 may include at least two separable portions—such as mandrel portion 202a and mandrel portion 202b—that facilitate removal of the part from the mandrel 202 at an appropriate stage in the manufacturing process.

Devices 200 and 250 may include a vertical movement shaft 210 disposed inside mandrel 202. Vertical movement shaft 210 may support a platform 212 inside mandrel 202. Vertical movement shaft 210 may provide vertical movement of platform 212 up and down relative to mandrel 202, as indicated by arrows 211, and vertical positioning of platform 212 inside mandrel 202. Vertical movement shaft 210 also may provide vertical movement up and down relative to mandrel 202, and vertical positioning inside mandrel 202 for other items that may be attached or connected to vertical movement shaft 210. Vertical movement shaft 210 may be implemented, for example, using a hydraulic lift mechanism or using a screw lift mechanism. In addition, vertical movement shaft 210 may be retractable below mandrel 202, so that, for example, mandrel 202 may be more easily placed so that vertical movement shaft 210 becomes disposed inside mandrel 202 and, also, so that mandrel 202 may be more easily removed and transported away from vertical movement shaft 210.

Platform 212 may be horizontal, as shown in FIGS. 2 through 4, and may rotate, as indicated by arrow 213, about vertical axis 214, which may or may not coincide with axis 204. Platform 212 may be supported by vertical movement shaft 210, and may be moved up and down by motion of vertical movement shaft 210. Alternatively, platform 212 may be supported by vertical movement shaft 210, and may move up and down relative to vertical movement shaft 210, allowing, for example, vertical movement shaft 210 to remain fixed and be supported at the top during operation of device 200 or device 250. Platform 212 may support a creel 216 (more clearly shown in FIGS. 3 and 4). Creel 216 may provide prepreg tow material, for example, to a material delivery head 218 (FIG. 2) or to multiple delivery heads 218 (FIGS. 3 and 4). Platform 212 may be dimensioned to support a human operator 220, for example, which may facilitate inspection and servicing of material delivery heads before, during, or after operation of device 200 or device 250. Also, for example, a platform 212 dimensioned to support a human operator 220 may facilitate hand lay up of composite material when needed.

Material delivery heads 218, for example, may be similar to material delivery head 100, such as a flat tape laying machine, contour tape laying machine, or fiber placement head. Material delivery heads 218, for example, may be adaptations of an existing delivery heads, such as a tape laying or fiber placement heads, as needed to meet surface contour requirements, as the contour of interior mandrel surface 208 may vary widely depending on the aircraft part that aircraft part manufacturing device 200 or device 250 is being used to manufacture. For example, tape laying heads may be used for material delivery heads 218 when the cross sections of mandrel 202 and interior mandrel surface 208 remain mostly constant, as seen in FIG. 2. By the same token, fiber placement heads may be more suitable for use for material delivery heads 218 when the cross sections of mandrel 202 and interior mandrel surface 208 change significantly along the length of the mandrel 202, for example. The vertical configuration of devices 200 and 250 may aid in the use of fiber placement heads, which are typically larger and more complex than tape laying heads.

Multiple material delivery heads 218 may be supported interior to the interior mandrel surface 208 on the inside 206 of mandrel 202, as shown in FIGS. 3 and 4, so that balanced pressure may be exerted by the multiple material delivery heads 218 in opposing directions inside mandrel 202 to aid in the delivery of composite material to interior mandrel surface 208. Composite material may be delivered simultaneously in multiple courses 222 directly to the outside mold line on the interior mandrel surface 208. For example, platform 212 may support multiple material delivery heads 218 inside interior mandrel surface 208 of mandrel 202, so that composite material is delivered directly to the outside mold surface on the inside of mandrel 202.

Device 200 may also include an arm mechanism 224 that may connect material delivery head 218 to vertical movement shaft 210, as shown in FIG. 2. Arm mechanism 224 may provide full circumferential positioning of the material delivery head 218 inside of mandrel 202 at the outside mold surface, i.e., interior mandrel surface 208.

Device 250 may include multiple arm mechanisms 224 that may connect material delivery heads 218 to platform 212, as shown in FIGS. 3 and 4. Arm mechanisms 224 of device 250 or of device 200 may provide individual motion of each material delivery head 218, i.e., motion that is independent of the other material delivery heads 218. Arm mechanisms 224 may provide individual motion of each material delivery head 218 relative to interior mandrel surface 208 in a direction normal to interior mandrel surface 208. Arm mechanisms 224 also may provide individual rotation of each material delivery head 218 relative to interior mandrel surface 208 about an axis normal to interior mandrel surface 208. Arm mechanisms 224 may additionally provide individual motion or position adjustment of material delivery heads 218 relative to interior mandrel surface 208 in a circumferential, or hoop, direction relative to interior mandrel surface 208 and relative to each other. Arm mechanisms 224 also may provide individual motion or position adjustment of each material delivery head 218 relative to interior mandrel surface 208 in an axial direction relative to interior mandrel surface 208, i.e., motion in a direction parallel to axis 204. Axial position adjustment of material delivery heads 218 may also be made relative to each other.

Independent axial position adjustment may be useful, for example, when placing plies of material in the circumferential direction, or hoop direction of the cylinder of mandrel 202. In this case, all, or some of the heads 218 may reposition themselves relative to each other axially, along the length of the mandrel 202, so that the bands, i.e., courses 222, of material placed would be adjacent to each other without overlap or gaps, when placed onto the mandrel 202 or interior mandrel surface 208.

In operation, material delivery heads 218 may translate along the entire length of the mandrel 202 while platform 212 rotates, allowing the material delivery heads 218 to simultaneously place material in multiple courses 222 over the entire mandrel surface, i.e., interior mandrel surface 208. The multiple courses 222 of composite material may be laid down in various patterns on interior mandrel surface 208 depending on the relative motion between material delivery heads 218 and mandrel 202. Vertical movement shaft 210 may provide an axial motion of material delivery heads 218, for example, by movement of platform 212 up and down, as indicated by arrows 211.

At the same time, platform 212 may or may not be rotated. For example, if material delivery heads 218 are held stationary while platform 212 is rotated, courses 222 of composite material may be laid down in a circumferential, or hoop, direction on interior mandrel surface 208. Also for example, if material delivery heads 218 are moved axially while platform 212 is not rotated, courses 222 of composite material may be laid down in an axial direction on interior mandrel surface 208. If both the multiple material delivery heads 218 are moved axially while platform 212 is rotated, courses 222 of composite material may be laid down in a helical pattern, with the helix angle depending on the relative velocities of motion and rotation.

Material delivery heads 218 may be controlled in coordination with the rotation and axial translation of platform 212, for example, by using existing numerical control (NC) or computer numerical control (CNC) programming software to control the material delivery heads 218 and platform 212 simultaneously. For example, rotation and translation of platform 212 may be controlled using CNC control coordinated with CNC control of the material delivery heads 218.

Device 250 may include autoclave features for curing the composite materials lay up on interior mandrel surface 208. For example, mandrel 202 may include a pressure vessel 252 surrounding mandrel 202 and having heating channels 254 for adjusting, maintaining, and controlling the temperature of interior mandrel surface 208, as shown in FIG. 4. Device 250 also may include an autoclave door 256 that may be sealable to pressure vessel 252 surrounding mandrel 202 for adjusting, maintaining, and controlling pressure and temperature conditions on the inside 206 of mandrel 202, for example, after lay up of composite materials on interior mandrel surface 208 and during the process of setting the composite materials.

A method for automated composite lay up on an interior mandrel surface may include situating a mandrel, having an axis and an outside mold surface on the inside of the mandrel, so that the axis is vertical. For example, mandrel 202 having axis 204 and interior mandrel surface 208 conforming to an outside mold surface, or OML, of a part to be manufactured may be situated so that axis 204 is vertical. The method may include placing the mandrel so that a vertical movement shaft is disposed inside the mandrel. For example, mandrel 202 may be placed around vertical movement shaft 210 so that vertical movement shaft is located on the inside 206 of mandrel 202.

The method may include supporting one or more composite material delivery heads—such as multiple material delivery heads 218, which, for example, may be composite tape laying machines or fiber placement heads—interior to the interior mandrel surface inside the mandrel and placing composite fiber from the multiple material delivery heads simultaneously onto the interior mandrel surface, i.e., onto the outside mold surface of the part. For example, a vertical movement shaft 210 may be used either to directly support an arm mechanism 224 or to support a platform 212 that supports one or more arm mechanisms 224. The platform 212 may be used to support arm mechanisms 224, for example, by attaching arm mechanisms 224 to platform 212.

The method may include moving and positioning one or more material delivery heads relative to the outside mold surface and delivering composite material from the material delivery heads directly to the outside mold surface on the inside of the mandrel. For example, each arm mechanism 224 may be used to support a material delivery head 218. Arm mechanisms 224 may be used to move and position each material delivery head 218 on the inside 206 of mandrel 202 so that composite material may be delivered directly to the outside mold surface, i.e., interior mandrel surface 208. For example, material delivery heads 218 may be moved and positioned by moving platform 212 up and down using vertical movement shaft 210 and by rotating platform 212 and arm mechanisms 224 around a vertical axis 214. Arm mechanisms 224 may be used to provide individual motion of material delivery heads 218 relative to the outside mold surface in a direction normal to the outside mold surface; and to provide individual rotation of the material delivery heads relative to the outside mold surface about an axis normal to the outside mold surface.

The method may also include separating two or more separable portions of the mandrel—such as mandrel portions 202a and 202b—and removing the manufactured part, for example, after autoclaving to cure or set the composite materials.

It should be understood, of course, that the foregoing relates to preferred embodiments of the invention and that modifications may be made without departing from the spirit and scope of the invention as set forth in the following claims.

I claim:

1. A device for automated composite lay up using a material delivery head, comprising:
   a mandrel having a vertical axis and an outside mold surface on the inside of said mandrel;
   a vertical movement shaft disposed inside said mandrel;
   an arm mechanism, supported by said vertical movement shaft, that moves and positions the material delivery head inside said mandrel, wherein composite material is delivered directly to said outside mold surface; and
   a pressure vessel having heating channels and surrounding said mandrel.

2. The device of claim 1, further comprising:
   a platform supported by said vertical movement shaft wherein said platform moves vertically up and down inside said mandrel.

3. The device of claim 1, wherein:
   said arm mechanism supports the material delivery head;
   said arm mechanism provides full circumferential positioning of the material delivery head inside of said mandrel at said outside mold surface.

4. A device for automated composite lay up of a part, comprising:
   a mandrel having a vertical axis, wherein said mandrel has an interior mandrel surface that conforms to an outside mold line of the part;
   a pressure vessel surrounding said mandrel, said pressure vessel having heating channels that maintain a temperature of said interior mandrel surface;
   a vertical movement shaft disposed inside said mandrel;
   an arm mechanism supported by said vertical movement shaft; and
   a material delivery head, supported by said arm mechanism, wherein said arm mechanism moves and positions said material delivery head relative to said interior mandrel surface, wherein composite material is delivered directly to said outside mold line on said interior mandrel surface.

5. The device of claim 4, wherein said mandrel includes two separable portions that facilitate removal of the part.

6. The device of claim 4, further comprising:
   a platform that is supported and moved up and down by said vertical movement shaft wherein said arm mechanism is attached to said platform.

7. The device of claim 4, wherein:
   said arm mechanism provides full circumferential positioning of said material delivery head to said outside mold line on said interior mandrel surface.

8. The device of claim 4 wherein:
   said arm mechanism provides motion of said material delivery head relative to said interior mandrel surface in a direction normal to said interior mandrel surface; and
   said arm mechanism provides rotation of said material delivery head relative to said interior mandrel surface about an axis normal to said interior mandrel surface.

9. A device for automated composite lay up of a part, comprising:
   a mandrel having a vertical axis, wherein said mandrel has an interior mandrel surface that conforms to an outside mold line of the part;
   a pressure vessel having heating channels and surrounding said mandrel;
   an autoclave door sealable to said pressure vessel;
   a vertical movement shaft disposed inside said mandrel;
   a platform that is supported and moved up and down on said vertical movement shaft;
   an arm mechanism attached to said platform; and
   a material delivery head, supported by said arm mechanism, wherein said arm mechanism moves and positions said material delivery head relative to said interior mandrel surface, wherein composite material is delivered directly to said outside mold line on said interior mandrel surface.

10. The device of claim 9 wherein:
    said arm mechanism provides motion of said material delivery head relative to said interior mandrel surface in a direction normal to said interior mandrel surface; and
    said arm mechanism provides rotation of said material delivery head relative to said interior mandrel surface about an axis normal to said interior mandrel surface;
    said arm mechanism provides circumferential positioning of said material delivery head relative to said interior mandrel surface.

11. The device of claim 9, further comprising:
    a plurality of material delivery heads, wherein said plurality of material delivery heads delivers composite material directly to said outside mold line on said interior mandrel surface.

12. The device of claim 9, wherein:
said platform supports a creel for said material delivery head;
said platform supports a control module for said arm mechanism; and
said platform is dimensioned to support a human operator.

13. The device of claim 9, wherein said mandrel includes at least two separable portions that facilitate removal of the part.

14. An aircraft part manufacturing device for automated composite lay up, comprising:
a mandrel having a vertical axis, wherein said mandrel has an interior mandrel surface that conforms to an outside mold line of the aircraft part;
a pressure vessel surrounding said mandrel, said pressure vessel having heating channels that maintain a temperature of said interior mandrel surface;
an autoclave door sealable to said pressure vessel that maintains a pressure at said interior mandrel surface;
a vertical movement shaft disposed inside said mandrel;
a platform wherein:
said platform is supported by said vertical movement shaft;
said platform is moved up and down on said vertical movement shaft; and
said platform rotates about said vertical axis;
an arm mechanism attached to said platform; and
a material delivery head, supported by said arm mechanism, wherein:
said arm mechanism provides motion of said material delivery head relative to said interior mandrel surface in a direction normal to said interior mandrel surface; and
said arm mechanism provides rotation of said material delivery head relative to said interior mandrel surface about an axis normal to said interior mandrel surface; and
said arm mechanism provides circumferential positioning of said material delivery head relative to said interior mandrel surface; and
composite material is delivered directly to said outside mold line on said interior mandrel surface.

15. An aircraft part manufacturing device for automated composite lay up, comprising:
a mandrel having an axis of symmetry and an outside mold surface on the inside of said mandrel,
means for maintaining a temperature and pressure condition on said inside of said mandrel;
means for situating said mandrel so that said axis of symmetry is vertical;
means for supporting a material delivery head inside said mandrel; and
means for moving and positioning the material delivery head inside said mandrel so that composite material is delivered directly to said outside mold surface.

16. The device of claim 15, further comprising:
means for moving the material delivery head vertically up and down inside said mandrel.

17. The device of claim 15, further comprising:
means for circumferentially positioning the material delivery head about a vertical axis and around the inside of said mandrel.

18. The device of claim 15 wherein said means for supporting a material delivery head further comprises:
means for providing motion of said material delivery head relative to said outside mold surface in a direction normal to said outside mold surface; and
means for providing rotation of said material delivery head relative to said outside mold surface about an axis normal to said outside mold surface.

19. A method for automated composite lay up of a part, comprising steps of:
situating a mandrel, having an axis and an outside mold surface on the inside of said mandrel, so that said axis is vertical;
placing said mandrel so that a vertical movement shaft is disposed inside said mandrel;
supporting an arm mechanism by said vertical movement shaft wherein said arm mechanism moves and positions a material delivery head inside said mandrel;
delivering composite material directly to said outside mold surface; and
curing said composite material via use of heating channels in a pressure vessel surrounding said mandrel providing temperature control of said outside mold surface on the inside of said mandrel and pressure control in the inside of said mandrel.

20. The method of claim 19, further comprising steps of:
attaching said arm mechanism to a platform;
supporting said platform by said vertical movement shaft;
moving said platform up and down using said vertical movement shaft.

21. The method of claim 19, further comprising a step of:
rotating said platform and said arm mechanism around a vertical axis.

22. The method of claim 19 wherein said supporting step further comprises:
providing motion of said material delivery head relative to said outside mold surface in a direction normal to said outside mold surface; and
providing rotation of said material delivery head relative to said outside mold surface about an axis normal to said outside mold surface.

23. The method of claim 19, further comprising steps of:
separating a plurality of separable portions of said mandrel; and
removing the part.

* * * * *